United States Patent [19]

Kawabe

[11] Patent Number: 4,831,445
[45] Date of Patent: May 16, 1989

[54] SPECIAL EFFECT SYSTEM FOR VIDEO SIGNAL

[75] Inventor: Shigehisa Kawabe, Tokyo, Japan

[73] Assignee: NEC Corporation, Japan

[21] Appl. No.: 131,900

[22] Filed: Dec. 11, 1987

[30] Foreign Application Priority Data

Dec. 11, 1986 [JP] Japan .............................. 61-295833
Jan. 7, 1987 [JP] Japan .................................. 62-566

[51] Int. Cl.$^4$ ............................................. H04N 5/14
[52] U.S. Cl. ...................................... 358/160; 358/22; 364/521; 340/724
[58] Field of Search ........................ 358/160, 22, 183; 364/521, 522, 561; 340/726, 723, 724

[56] References Cited

U.S. PATENT DOCUMENTS

| | | | |
|---|---|---|---|
| 4,479,192 | 10/1984 | Yamagami | 364/521 X |
| 4,533,952 | 8/1985 | Norman, III | 358/160 |
| 4,563,703 | 1/1986 | Taylor et al. | 358/160 |
| 4,667,236 | 5/1987 | Dresdner | 358/160 |
| 4,680,630 | 7/1987 | Field | 358/160 |

Primary Examiner—James J. Groody
Assistant Examiner—Victor R. Kostak
Attorney, Agent, or Firm—Ostrolenk, Faber, Gerb & Soffen

[57] ABSTRACT

A special effect system for a video signal comprises a distance calculator for calculating a distance between any given picture element data stored in a video memory, and a predetermined straight line. Certain picture elements are to be relocated in the final image, depending on their distance from the predetermined straight line, to obtain a particular special effect. A function generator including a readable function memory receives the calculated distance data as a read address to the function memory, whereby the calculated distance becomes the effective parameter for generating the special effects. A read address to the video memory is produced by utilizing the output from the function generator.

12 Claims, 5 Drawing Sheets

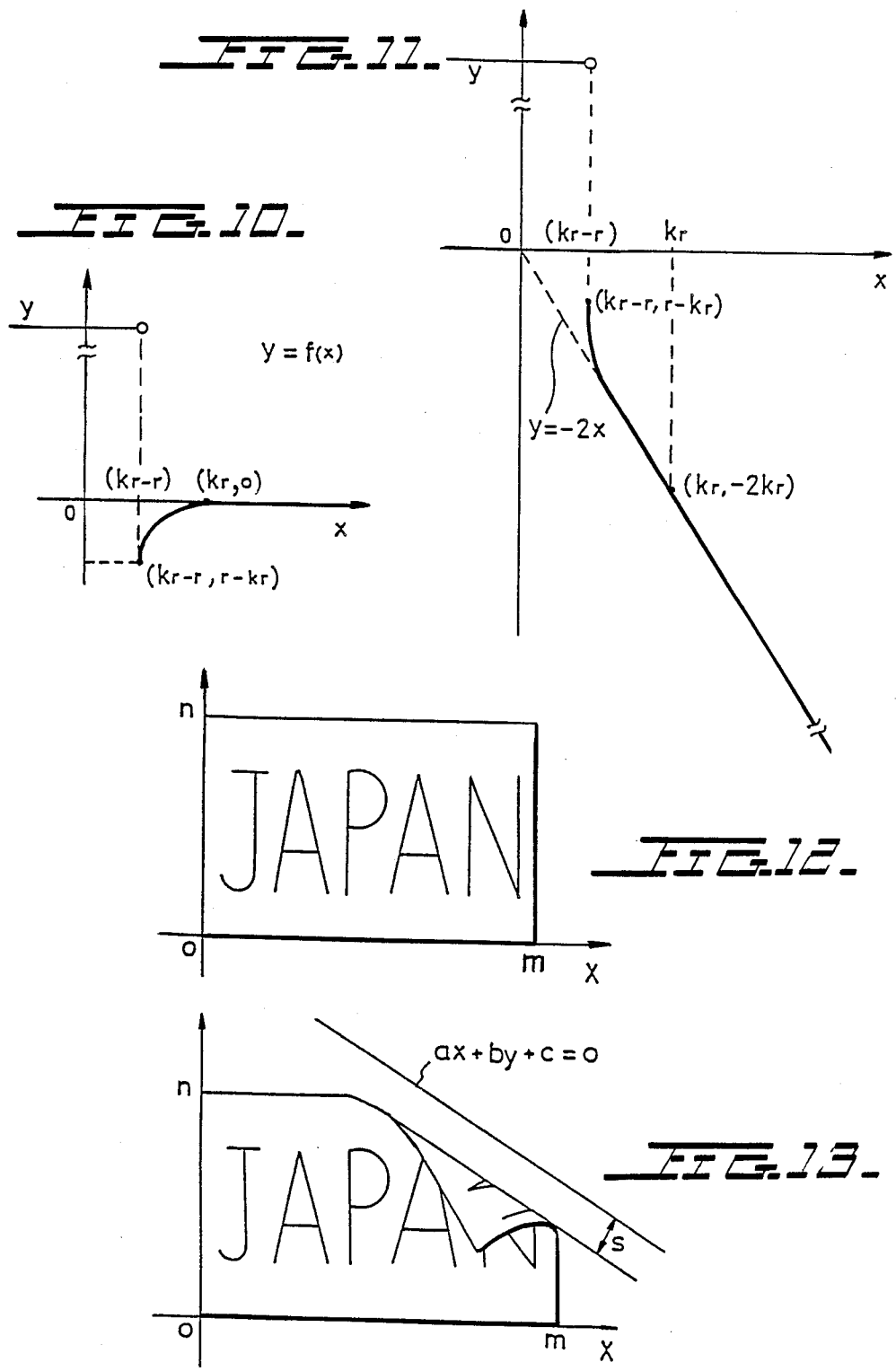

4,831,445

SPECIAL EFFECT SYSTEM FOR VIDEO SIGNAL

BACKGROUND OF THE INVENTION

The present invention relates to a special effect system for a television video signal, and particularly to a special effect system which produces special effects in which a video image is bent or turned, rolled up or made wavy with reference to a designated reference straight line.

In a special effect system for a television video signal, various special effects are generated by employing a digital video memory and producing a special write or read address therefor. To obtain such special address, a function generating circuit which comprises at least a multiplier, a divider, an adder and a subtractor is conventionally used, and thus the construction is extremely complicated. Particularly, in order to generate effects in which the video image is turned, rolled up or made wavy with reference to the designated reference straight line, it is necessary for a trigonometric function and a hyperbolic function to be generated. Conventionally, many multipliers, dividers, adders and subtracters are required for generating such functions. Further, for modifying the functions to be generated, the interconnections of these components must be changed, thus involving a disadvantageous complicated configuration.

SUMMARY OF THE INVENTION

Accordingly, an object of the invention is to provide a special effect system for a video signal having an address generator which is simple in construction and has means for easily modifying the functions generated, thus removing the aforementioned defects, which are unavoidable with the conventional technique.

According to the invention, a special effect system for a video signal comprises a distance calculator for calculating a distance between a position of any given picture element data stored in a video memory, and a predetermined striaght line. Certain picture elements are to be relocated in the final image, depending on their distance from the predetermined straight line, to obtain a particular special effect. A function generator including a readable function memory receives the calculated distance data as a read address to the function memory, whereby the calculated distances becomes the effective parameter for generating the special effect. A read address to the video memory is produced by utilizing the output from the function generator.

BRIEF DESCRIPTION OF THE DRAWINGS

FIGS. 10 and 11 are diagrams showing other functions f(x) and g(x) associated with a second example of the invention;

FIG. 12 shows another example of an inputted video image;

FIG. 13 is a diagram showing a generated video image corresponding to the inputted video image of FIG. 12 which is realized by using the functions shown in FIGS. 10 and 11.

PREFERRED EMBODIMENT OF THE INVENTION

Figure 1:
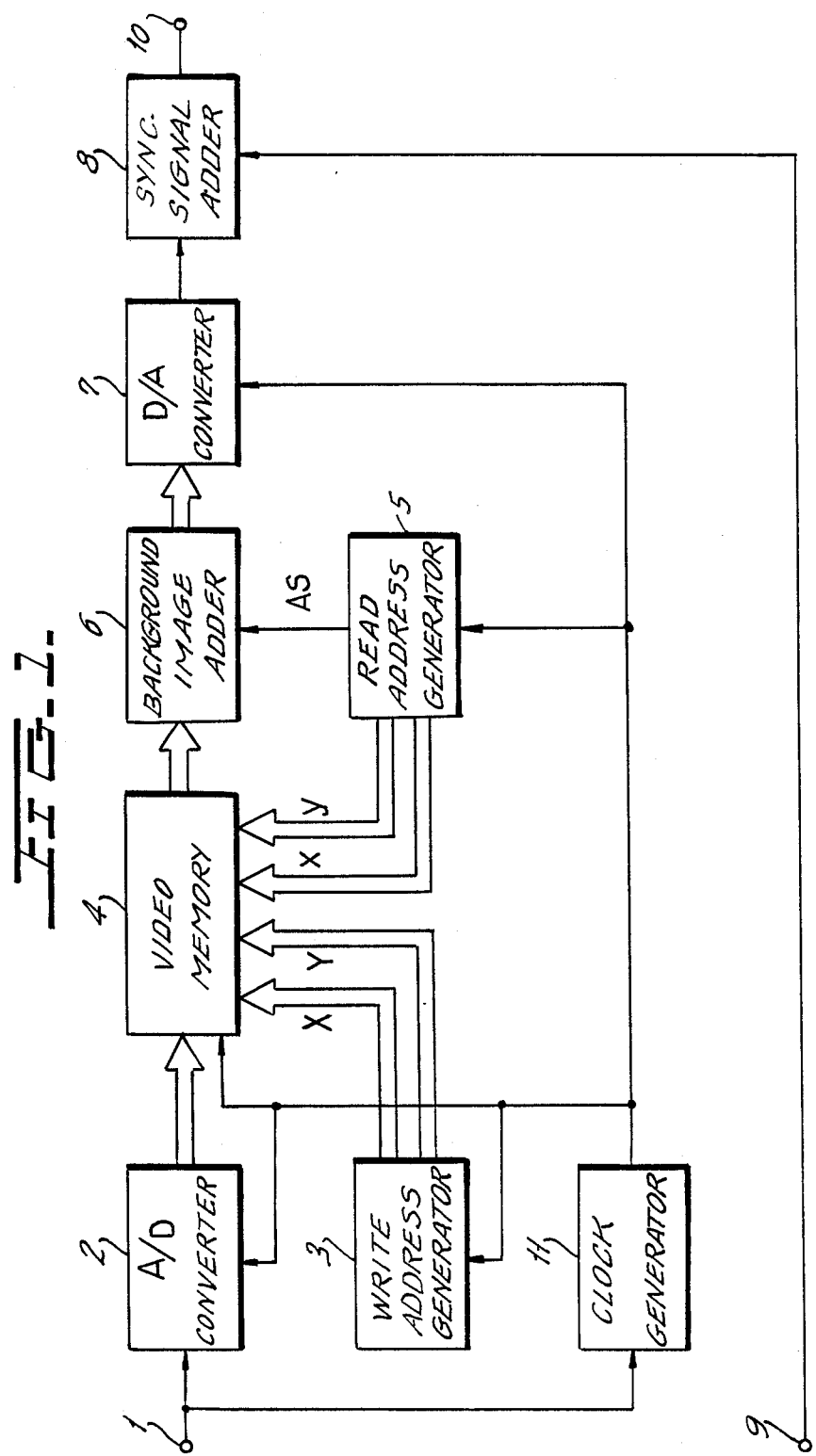
FIG. 1 is a general block diagram of a special effect system for a video signal in which the present invention is applied.

FIG. 1 is a block diagram of a special effect system for a television video signal in which the present invention is applied. In FIG. 1, an analog television signal is fed to an input terminal 1, and an A/D converter 2 converts the analog video signal from the input terminal 1 into a digital (PCM) video signal. A write address generator 3 generates a write address determining a location in a video memory 4 where the digital video signal is to be stored. A read address generator 5 generates a read address for reading the stored video signal from the video memory 4. A background image adder 6 adds a background image to the digital video signal read out from the video memory 4. A D/A converter 7 converts the digital video signal delivered from the background image adder 6 into an analog video signal. A synchronizing signal adder 8 adds a reference synchronizing signal fed from an input terminal 9 to the analog video signal from the D/A converter 7 and the output signal of the adder 8 is fed to an output terminal 10. A clock generator 11 generates a clock synchronized with the input video signal and supplies it to the A/D converter 2, the address generators 3 and 5, the video memory 4, and the D/A converter 7.

In FIG. 1 the analog television video signal is converted into an 8-bit binary code, for example, by the A/D converter 2, and the write address generated by the write address generator 3 comprises an x-coordinate and a y-coordinate. Then, the digital video signal from the A/D converter 2 is stored into the video memory 4 in a location determined by the x-coordinate and the y-coordinate. The read address generator 5 similarly generates a reading address including an x-coordinate and a y-coordinate and supplies it to the video memory 4. The stored digital video signal is read out from the video memory 4 in accordance with the x-coordinate and the y-coordinate generated by the read address generator 5.

Figure 2:
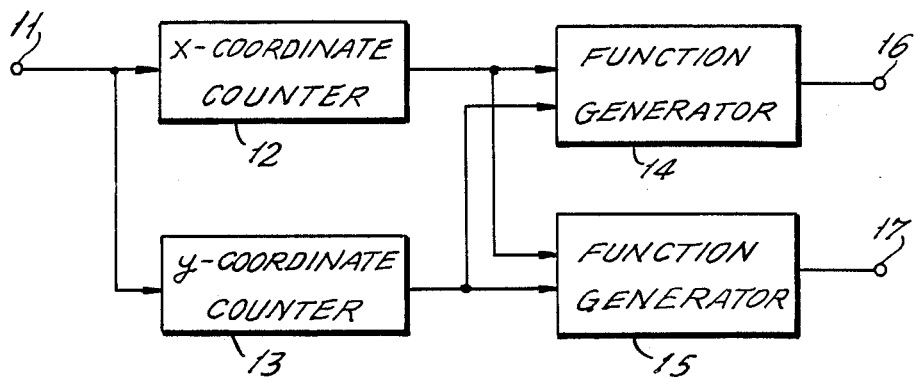
FIG. 2 is a block diagram of a read address generator according to a conventional technique.

One example of a conventional read address generator will be described with reference to FIG. 2. In the figure, a clock signal is supplied from an input terminal 11 to an x-coordinate counter 12 and a y-coordinate counter 13. Function generators 14 and 15 receive the outputs of the counters 12 and 13, respectively, and generate functions F(x,y) and G(x,y). Conventionally, the function generators 14 and 15 are constructed by combining, for example, at least an adder, a subtracter, a divider and a multiplier, and generate the predetermined functions by processing the x-coordinate and the y-coordinate from the counters 12 and 13 by means of this combination of components. The processed x-coordinate and y-coordinate from the function generators 14 and 15 are supplied to a video memory as a reading address through output terminals 16 and 17.

As described above, the conventional address generator requires a complicated configuration including an adder, a subtracter, a multiplier and a divider to generate a desired function. Particularly, when trigonometric and hyperbolic functions are to be generated, an even more complicated configuration is required. Further, it is necessary to change the particular combination of the adder, the subtractor the multiplier and the divider when a desired function is to be changed.

Figure 3:
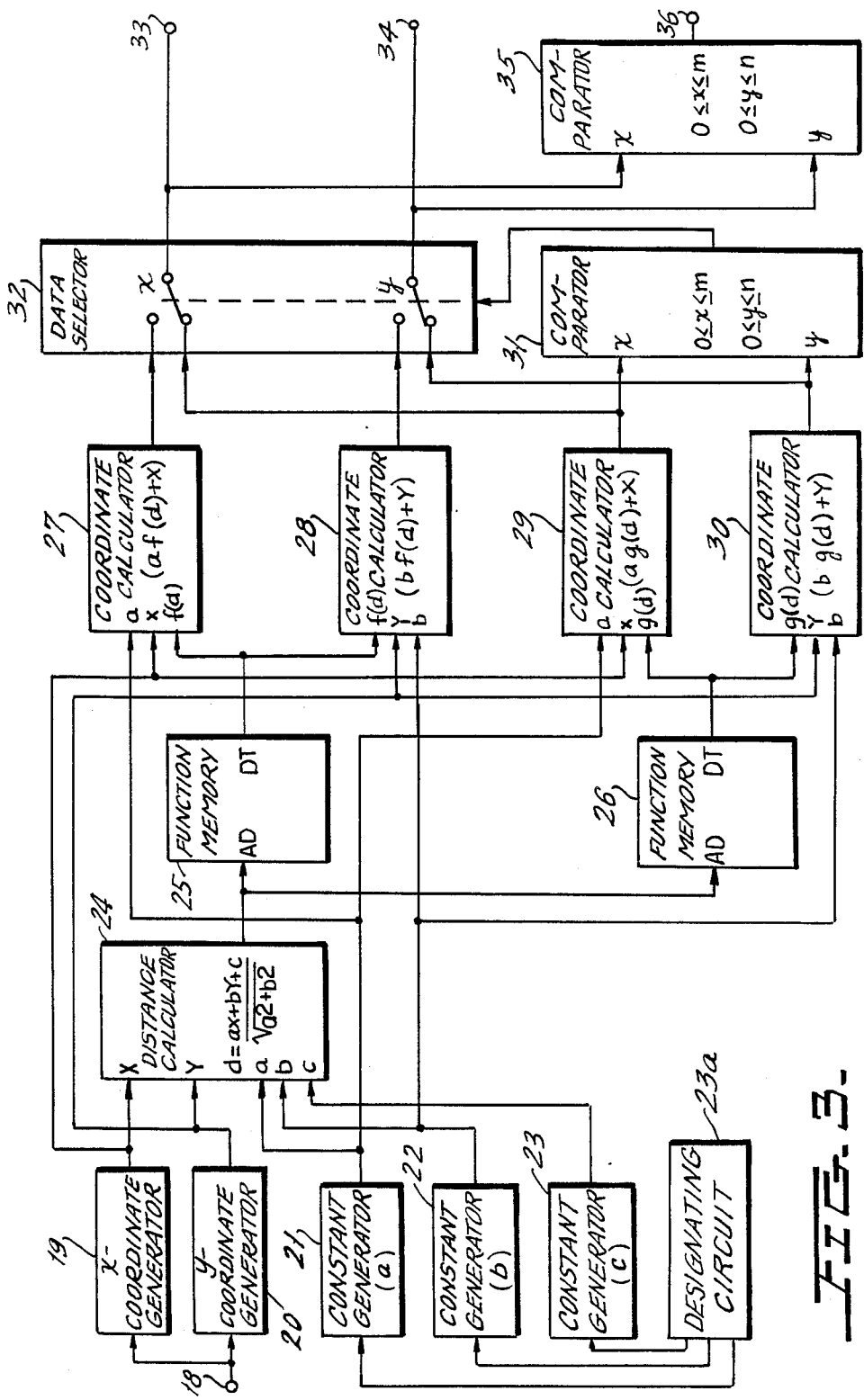
FIG. 3 is a block diagram of a read address generator for a video memory according to the present invention.

FIG. 3 is a block diagram of a read address generator according to an embodiment of the invention. In the figure, an x-coordinate generator 19 and a y-coordinate generator 20 generate an x-coordinate X and a y-coordinate Y by counting a clock signal fed from an input terminal 18. Constant generators 21, 22 and 23 generate constants a, b and c, respectively, under a control of a designated circuit 23a. A distance calculator 24 calculates a distance from a point (X, Y) to a predetermined straight line L. In this case, the point (X, Y) is determined by the x-coordinate X and the y-coordinate Y delivered from the generators 19 and 20, and the straight line L is indicative of an aggregation of the points satisfying $ax+by+c=0$. Therefore, the distance d is obtained by the following equation:

$$d = (aX + bY + c)/\sqrt{a^2 + b^2}$$

The straight line L divides an image area into two areas, and a sign (plus or minus) is also determined with regard to the calculated distance d in accordance with the respective one of the two area in which the point (X, Y) lies.

A function memory 25 is constituted of a programable read only memory or a readable/writable memory, for example. The memory 25 previously stores a set of pertinent values so as to deliver a function f(u) when it receives an input u as a read address. Similarly, a function memory 26 delivers a function g(u) when receiving an input u as a read address. Both the function memories 25 and 26 are used as a function generator in the invention, consequently. A coordinate calculator 27 calculates a coordinate (a f(d)+X) in response to the constant a, the x-coordinate X and the function f(d). A coordinate calculator 28 calculates a coordinate (b f(d)+Y) in response to its input b, Y and f(d). A coordinate calculator 29 calculates a coordinate (a g(d)+X) in response to its inputs a, X and g(d). Further, a coordinate calculator 30 calculates a coordinate (b g(d)+Y) in response to its inputs b, Y and g(d).

A comparator 31 receives the coordinate value x, i.e., (a g(d)+X) and the coordinate value y, i.e., (b g(d)+Y) from the coordinate calculators 29 and 30, and generates a logical value "1" only when $0 \leq x \leq m$ and $0 \leq y \leq n$. In this case, the value m is determined as a maximum value of the x-coordinate and the value n is determined as a maximum value of the y-coordinate. Otherwise, the comparator 31 generates a logic value "0". A data selector 32 selects the outputs (a f(d)+X) and (b f(d)+Y) of the coordinate calculators 27 and 28, and delivers them to output terminals 33 and 34, respectively, when the logic value delivered from the comparator 31 is "0" and unless a value of the function g(d) is undefined. Otherwise, the data selector 32 selects the outputs (a g(d)+X) and (b g(d)+Y) of the coordinate calculators 29 and 30, and delivers them to the output terminals 33 and 34, respectively, when the logical value delivered from the comparator 31 is "1" and the function f(d) is defined, or when the function g(d) is undefined and the function f(d) is defined.

Another comparator 35 generates a logical value "1" to an output terminal 36 only when the coordinate values x and y supplied to the output terminals 33 and 34 are $0 \leq x \leq m$ and $0 \leq y \leq n$, respectively. Otherwise, the comparator 35 generates the logical value "0" to the terminal 36. As described above, the value m corresponds to the maximum value of the x-coordinate and the value n corresponds to the maximum value of the y-coordinate.

For examaple, let it be assumed that the constants a, b and c are designated under the condition where $a^2+b^2=1$, $a>0$, $b>0$, $0<c<m$ and $0<c<n$.

Figure 4:
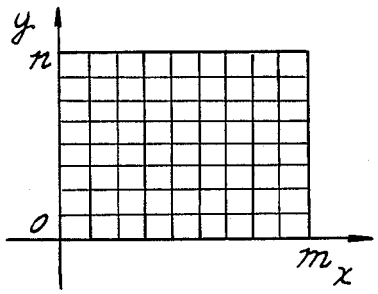
FIG. 4 shows one example of an inputted video image.

Now the operation of the embodiment will be described. It is now assumed that a video image shown in FIG. 4 is supplied to the special effect system according to the present invention. The input video data are stored in the video memory 4 (FIG. 1).

Next, for reading operation, the distance d determined between a position (X, Y) of a picture element to be indicated on a telvision screen and the straight line L defined by $(ax+by+c=0)$ is calculated by the equation $\{d=(ax+by+c)\}$. After this, the coordinate calculators 27, 28, 29 and 30 calculate (a f(d)+X), (b f(d)+Y), (a g(d)+X) and (b g(d)+Y) in response to the function outputs f(d) and g(d) from the memories 25 and 26, and the constants a, b and c from the constant generators 21, 22 and 23. The comparator 31 selects the set of (a f(d)+X) and (b f(d)+Y) or the set of (a g(d)+X) and (b g(d)+Y), and delivers the selected set as a reading address including an x-coordinate and a y-coordinate which is used for reading video data stored in the video memory 4 (FIG. 4).

Figure 5:
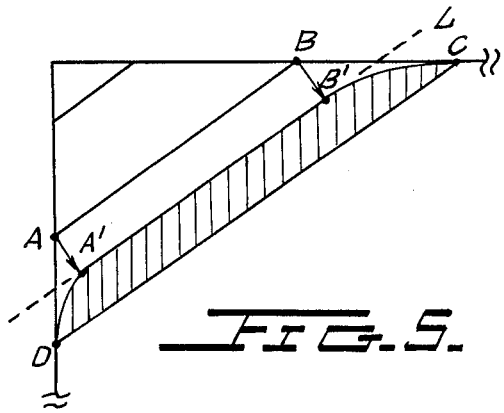
FIGS. 5 and 6 are diagrams for explaining a first example of the present invention.
Figure 6:
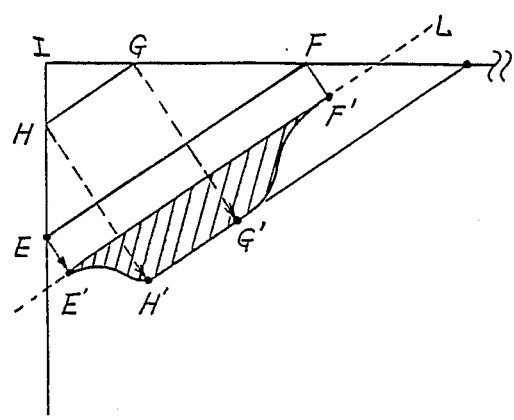

In a first example of a special effect to be generated the coordinate conversion that is produced by the coordinates (a f(d)+X, b f(d)+Y) with respect to the coordinates (X, Y) has the effect that a trapezoidal doamin ABCD is transformed into a domain A'B'CD as shown in FIG. 5. Similarly, the coordinate conversion of the coordinates (a g(d)+X, b g(d)+Y) with respect to the coordinates (X, Y) means that a trapezoidal domain EFGH is transformed into a domain E'F'G'H' as shown in FIG. 6. In this case, a domain GHI disappears after the transformation. Further, a portion in the domain A'B'CD over-lapping with the domain E'F'G'H' disappears by the operation of the data selector 32.

Figure 7:
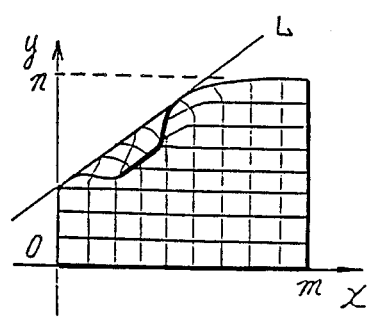
FIG. 7 shows a generated video image corresponding to the inputted video image shown in FIG. 4.

Consequently, as shon in FIG. 7, there is obtained an effect wherein an input video image is transformed to be rolled up along an inner cylinder of radius r. Here, in order to produce the effect as shown in FIG. 7, functions f and g are defined as follows:

| | |
|---|---|
| $f(t) = $ undefine | $t < 0$ |
| $f(t) = (r - t) - r \arcsin(r - t)/r$ | $0 \leq t < r$ |
| $f(t) = 0$ | $r \leq t$ |
| $g(t) = $ undefine | $t < 0$ |
| $g(t) = (r - t) + r(\arcsin(r - t)/r) - \pi)$ | $0 \leq t < 2r$ |
| $g(t) = $ undefine | $2r \leq t$ | where r denotes a constant, and "undefine" means that an output can not be defined in the function generator 25 or 26, i.e., output values of the coordinate calculators 27, 28, 29 and 30 become less than 0 or greater than the maximum values m and n.

Figure 8:
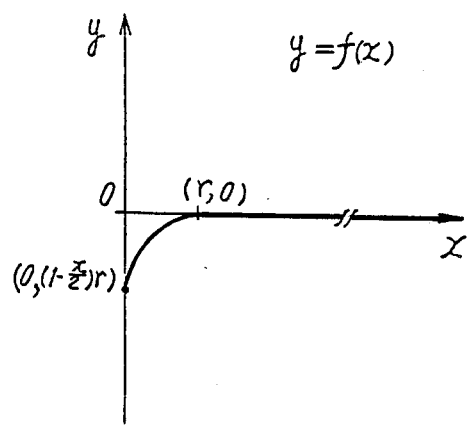
FIGS. 8 and 9 ae diagrams showing functions f(x) and g(x) associated with the generated video image shown in FIG. 7.
Figure 9:
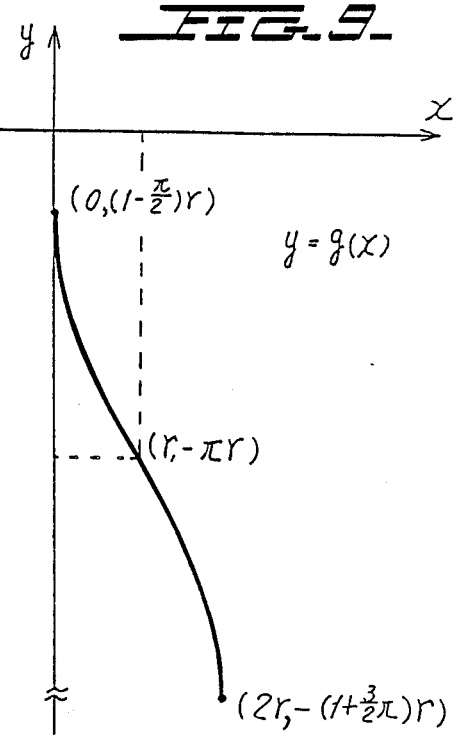

In this example, $y=\arcsin(x)$ indicates an inverse function of a trigonometric function $y=\sin(x)$ within $-\pi/2 \leq x \leq \pi/2$. These functions f and g are graphically shown in FIG. 8 and FIG. 9, respectively.

Now a second example of a special effect will be described. Let it be assumed that functions f and g are defined as follows:

$$f(t) = \text{undefine} \qquad kr - rt > t$$
$$f(t) = (kr - t) - r\arcsin((kr - t)/r) \qquad kr > t \geq kr - r$$
$$f(t) = 0 \qquad t \geq kr$$
$$g(t) = \text{undefine} \qquad kr - r > t$$
$$g(t) = -2t - (kr - t) + r\arcsin((kr - t)/r) \qquad kr > t \geq kr - r$$
$$g(t) = -2t \qquad t \geq kr$$

where k is a constant equal to $\frac{1}{2}$ of $\pi$, r is a constant, "undefine" is a constant whereat output values of the coordinate calculators 27, 28, 29 and 30 ae less than 0 or greater than the maximum value m of the x-coordinate and the maximum value n of the y-coordinate. Then, $y=\arcsin(x)$ indicates the inverse function of the trigonometric function $y=\sin(x)$ within $-\pi/2 \leq x \leq \pi/2$. FIGS. 10 and 11 graphically show the functions f and g, respectively. Further, the constants a, b and c are specified under the condition where $\sqrt{a^2+b^2}=1$, $a<0$, $b<0$, $0<c<m$ and $0<c<n$. As a result, there is obtained an effect wherein an input video image shown in FIG. 12 is transformed to be turned up along a cylinder of radius r as shown in FIG. 13 (page-turn effect). In FIG. 13, S corresponds to (kr-r).

In a third example of a special effect, the function f is defined as follows:

$$f(t) = r \sin(t/r)$$

Figure 14:
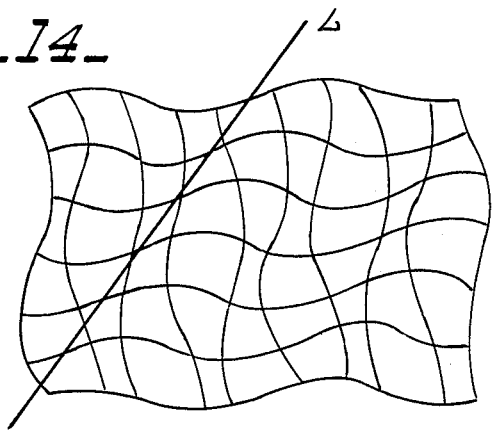
FIG. 14 is a diagram showing a generated video image according to a third example of the invention, which generated a wave effect.

A wavy image as shown in FIG. 14 is obtained from the input video image of FIG. 4 according to this example of the present invention. In this case, a function g is set to a predetermined fixed value such that the comparator 31 delivers a logical level "0" to select the outputs of the coordinate calculators 27 and 28 in the selector 32.

As described above, according to the present invention, a special effect system capable of producing a complicated transformation of a video image, such as the rolling up effect, the page-turn effect, and the wave effect, can be realized with a simple configuration by combining a distance calculator and a function generator which includes a function memory. Further, by modifying only the contents of the memory, many desired effects can be easily obtained.

What is claimed is:

1. A special effect system for a video signal including a write address generating means, a video memory means and a reading address generating means, wherein a special effect picture is created by controlling a read address generated by said reading address generating means, said reading address generating means comprising:

means for setting constants a, b, c for defining a predetermined straight line to serve as a reference for the special effect on a video image;

coordinate generator means for receiving a clock signal synchronized with a television sequence and for generating an x-coordinate and a y-coordinate, said x-coordinate and y-coordinate defining coordinates (X, Y) of an arbitrary picture element;

distance calculating means for calculating a distance d of the coordinates (X, Y), defined by said coordinate generator means, to said straight line specified by said constants a, b and c;

function generator means for generating first and second function data f(d) and g(d) according to predetermined functions f(u) and g(u), in response to said distance d delivered from said distance calculating means; and read address producing means for producing a read address to be supplied to said video memory means in response to the first and second function data f(d) and g(d) from said function generator means, the coordinates (X, Y) from said coordinate generator means, and the constants a and b from said setting means.

2. The special effect system as claimed in claim 1, said read address generating means including:

means for calculating a first x-address value {a f(d)+X};

means for calculating a second x-address value {a g(d)+X};

means for calculating a first y-address value {b f(d)+Y};

means for calculating a second y-address value {b g(d)+Y};

x-address switching means for alternately selecting said first x-address value {a f(d)+x} and said second x-address value {a g(d)+X} and delivering an x-address output value; and y-address switching means for alternately selecting said first y-address value {b f(d)+Y} and said second y-address value {b g(d)+Y} and delivering a y-address output value.

3. The special effect system as claimed in claim 2, said read address generating means further including a means receiving said second x-address and y-address values for controlling said x-address switching means and y-address switching means according to values of the received x and y address values.

4. The special effect system as claimed in claim 2, said read address generating means further including range means for determining a special effect range on the video image, in response to the x-address value delivered from said x-address switching means and the y-address value delivered from said y-address switching means.

5. The special effect system as claimed in claim 1, wherein said first and second functions f(d) and g(d) are functions of an inverse trigonometric function.

6. The special effect system as claimed in claim 1, wherein said predetermined straight line is defined on the video image as $(ax+by+c=0)$.

7. The special effect system as claimed in claim 6, wherein $a^2+b^2=1$.

8. The special effect system as claimed in claim 1, wherein said function generator means comprises an f(u) function memory and a g(u) function memory, said function memories respectively containing data for delivering said functions f(d) and g(d) when said distance d is supplied as a read address to said memories.

9. The special effect system as claimed in claim 8, wherein said function memories are PROMs.

10. The special effect system as claimed in claim 8, wherein said function memories are readable/writable memories.

11. The special effect system as claimed in claim 4, wherein said special effect system further includes background image adding means for adding a background image data to an output from said video memory means, said background image adding means being responsive to said range determining means.

12. In a special effect system for television video signals, having an A/D converter for obtaining a digital video signal from an analog video signal, a video memory for storing said digital video signal from said A/D converter, a write address generator for generating a write address determining a location in said video memory where said digital video signal is written correspondingly, a read address generator for generating a read address to read the stored digital video signal from said video memory and a D/A converter for converting the digital video signal read out of said video memory into an analog video signal, the improvement wherein said read address generator comprises a distance calculator for calculating a distance between each picture element of a video image and a predetermined straight line determined on the video image, and a function generator responsive to said distance for generating a function by transforming said distance to produce said read address.

* * * * *